Patented Apr. 12, 1938

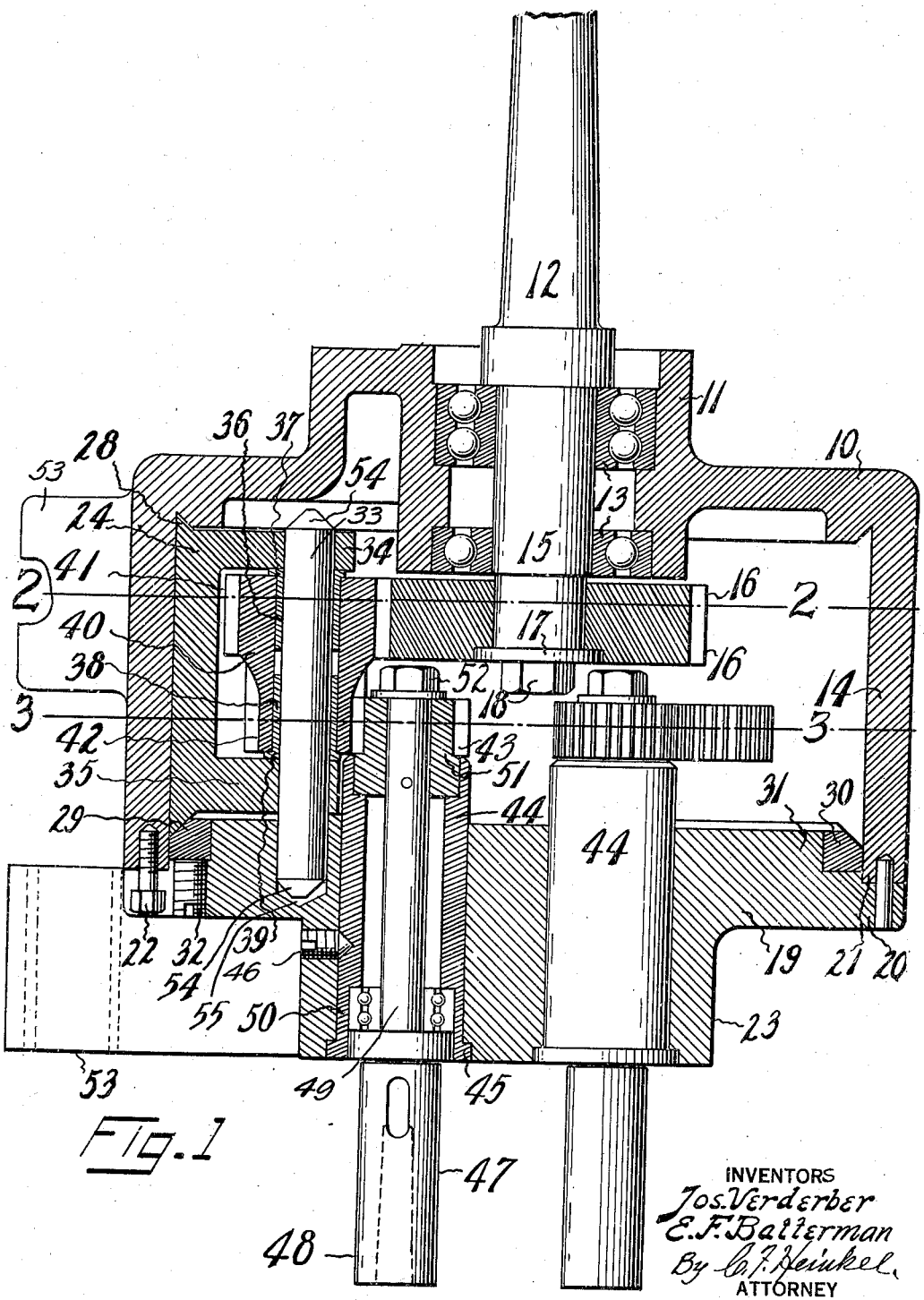

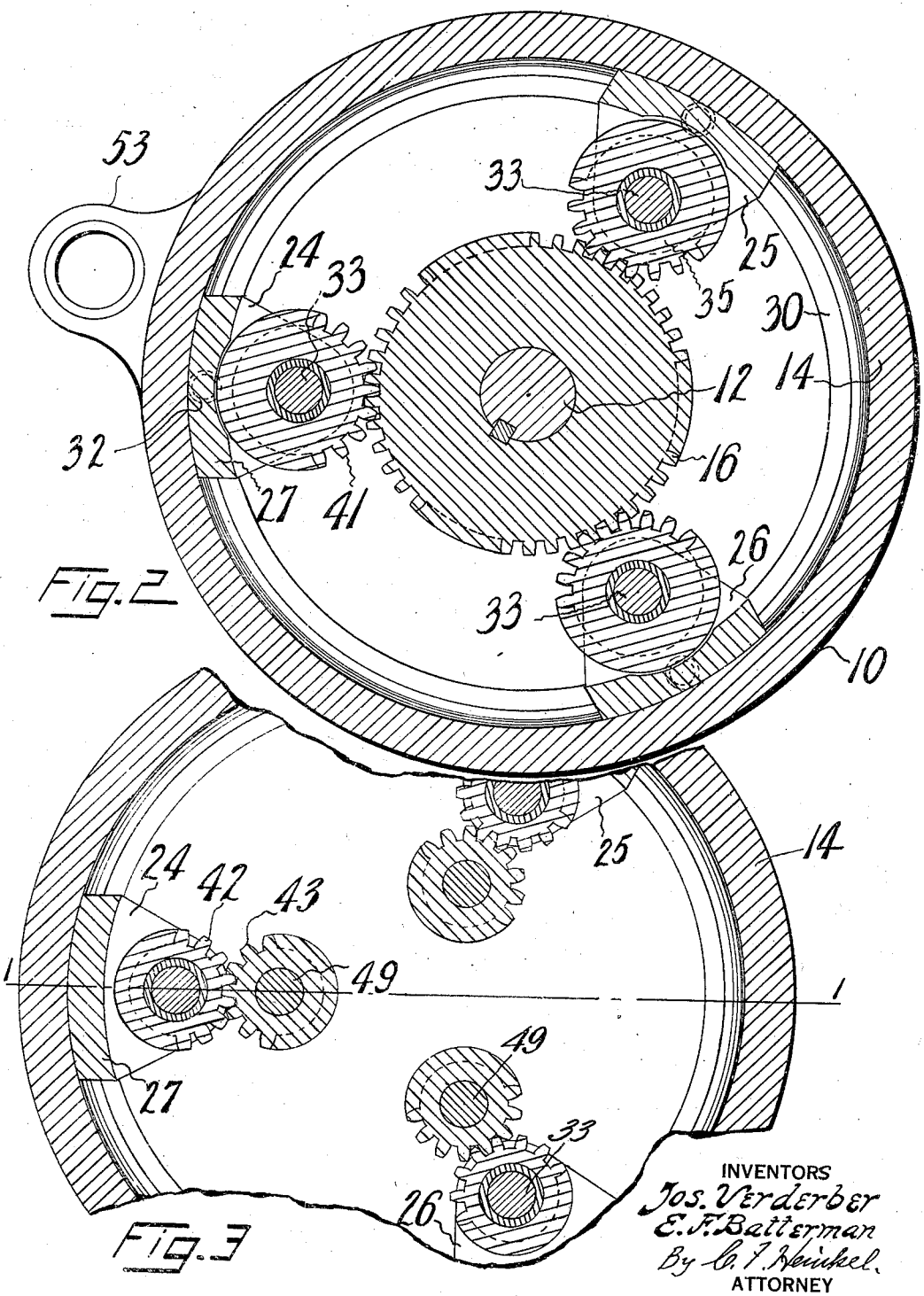

2,114,039

UNITED STATES PATENT OFFICE 2,114,039

SPINDLE HEAD

Joseph Verderber, Cleveland, and Elmer F. Batterman, East Cleveland, Ohio

Application April 19, 1935, Serial No. 17,360

2 Claims. (Cl. 77—22)

The present invention relates to relative setting of spindles in multiple spindle heads and driving for the spindles.

In the pertaining art it is a desirable feature that spindles in spindle heads be laterally adjustable to attain various lateral relations of spindles for various kinds of work. Such adjustment permits of one spindle head being used for different kinds of work and eliminates the necessity of providing an individual spindle head for each kind of work.

Objects of the present invention are:

To provide a simple, efficient spindle head with exchangeable covers each having spindles laterally spaced therein and an adjustable means in the head to relate the driving means of the spindles with the main driving means for the head.

To provide a spindle head with means whereby the driving relation between the spindles and the main driving means for the head is retained by attachment of the covers onto the head.

To provide a spindle head with brackets guided to move in a definite circular path.

To provide a spindle head with lockable, easily removable cover plates each having definitely spaced spindles therein and with means for adjustability of the mechanism in the head to conform to the various spacings of the spindles in the plate.

To provide an adjustable spindle head with means for retaining the spindles in adjusted positions and relations by a locking means which can not change the spindle adjustments.

Other objects will be pointed out in this specification or will become obvious or apparent or will suggest themselves upon an inspection of this specification and of the accompanying drawings.

In the accompanying drawings, forming part of this specification:

Fig. 1 is a section taken through the middle of a spindle head having three spindles therein.

Fig. 2 is a section taken on line 2—2 of Fig. 1 showing the gear relation between the main and the intermediate driving means and one spacing or setting of three spindles, two set on one radius and the third set on a different radius.

Fig. 3 is a fragmental section taken on line 3—3 of Fig. 1 showing the driving relation between the driving member of the spindles and that of the intermediate driving part.

Similar reference characters refer to similar parts throughout the views.

The casing 10 of the head has the central hub 11 and the driving spindle 12 journaled therein by means of the ball bearings 13 although plain or roller bearings or any other kind of bearings could be used; the object being to provide a substantial journal bearing for the driving spindle.

The casing is counterbored to provide the circular wall 14 concentric with the axis of the journal for the spindle and the end 15 of the spindle extends into this counterbore and has a driving member or driving means, in the present instance the gear 16, secured thereto to rotate therewith and is held thereon endwise by the collar 17, in this instance countersunk into the gear 16, and the nut 18 threaded onto the spindle end 15.

The cover plate 19 has the flange 20 closing in this instance the open end of the counterbore in the casing, is centralized in the counterbore by means of the concentric shoulder 21 and is held onto the end of the casing by means of the screws 22 as shown. A new cover plate is required for each different layout or driven spindle spacing; the hubs or bosses 23 are provided for that purpose and are spaced according to a layout desired. The bosses and the mechanism therein are duplicates so that description of one answers for all of them.

The cover 19 is exchangeable on the casing. Different covers may have different layouts of spindles and the below described mechanism in the casing is adjustable therein to connect the driving means for the spindles with the main driving means.

The illustration in the drawings shows three brackets 24, 25, and 26, duplicates of each other, and each having the base or wall 27 the outer surface of which is curved and conforms to the curvature of the inner surface of the wall 14. The base 27 has, in this instance, the longitudinal ends 28 and 29 beveled as shown for purposes appearing presently. The clamping ring 30 is annular and is centralized on the cover plate by means of the inner surface thereof fitting to the outer surface of the projection 31. The outer circumferential surface of the clamping ring has the bevel surface conforming to the bevel surface 29 on each of the brackets. The screws 32, three being shown in this instance, are threaded into the flange 20 and bear endwise against the outer side of the ring 30 so that, upon tightening of the screws 32, the ring 30 will be moved axially in the counterbore, the bevel face 28 will engage with the correspondingly beveled face in the bottom of the counterbore as shown while the bevel face 29 engages with the correspondingly beveled face on the ring 30 and each bracket will thereby be moved radially outwardly and longitudinally of the casing and clamped against the inner wall of the counterbore.

The pin 33 of each bracket, forming a part of the intermediate driving connection, extends through the arms 34 and 35 and also extends into the cover plate and fits closely into the opening 55 of the cover plate and into the arms. Preferably, this fit is made tight so that the pin can not rotate. However, it may be made sufficiently loose so that the same can rotate when something goes wrong with the mechanism mounted thereon to prevent damage to parts of the mechanism.

The bushing 36 is telescoped over the upper end of the pin 33, has the head 37 thereon in abutment on the inner face of the arm 34 and may be tight on the pin or rotatable thereon. The bushing 38 is telescoped over the lower end of the pin 33, has the head 39 thereon in abutment on the inner face of the arm 35 and may be tight on the pin or rotatable thereon.

The sleeve 40 is telescoped over both of the bushings and may be tight or rotatable thereon. The upper end of the sleeve has thereon a driven element in the form of a gear 41 in this instance in operative relation and mesh with the gear 16 and forming part of the intermediate driving connection. The lower end of the sleeve has thereon a driving element in the form of the gear 42 which drives the driven element in the form of the gear 43 in this instance and described below.

The hollow sleeves 44 are mounted in the corresponding hubs or bosses of the cover plate and have the heads 45 thereon to form an axial abutment for the sleeves on the cover plate. The screws 46 are threaded into the cover plate and have the pointed ends thereof countersunk into the sleeves as shown.

Each of the driven spindles 47, in this instance, has the socket 48 in one end thereof to receive a tool shank and also has the diametrically reduced part or stem 49 extending through and journaled in the sleeve 44 by means of the ball bearings 50 although plain or roller bearings or any other kind of bearings may be used. The sleeve 51 is telescoped over the upper end of the stem 49 and has the lower end thereof countersunk into the upper end of the sleeve 44 and is held in endwise abutment thereon by means of the nut 52 threaded onto the upper end of the stem 49. The above mentioned gear 43 forms the upper end of the sleeve 51 and rotates the stem 49 and the spindle 47.

The boss 53 is shown as being bushed and serves the purpose of a guide means for the head by telescoping over a guide pin when the latter is provided independently of the head.

The brackets are movable around on the concentric wall of the casing for adjustment of spindles and are tightened or clamped against the wall by means of the screws 32. The adjustment of the brackets is concentric with the axis of the driving spindle.

The gears 43 and the driven spindles 47 can rotate about the common axis of the gears 41 and 42 when not confined by the cover plate. The adjustability of the brackets themselves affords a means of locating driven spindles in different relationships with each other but concentric with the axis of the head. The adjustability of the driven spindles about the axis of the gear 16 affords a means for adjusting the driving spindles into different relationships in addition to the concentric adjustment mentioned and may be concentric or nonconcentric as occasion may require.

The spindle setting may be attained either by first boring the cover plate for a required spindle spacing, then mounting the spindles in the cover plate, then adjusting the brackets to bring the gears 43 into mesh with the gears 42 when the cover plate is attached to the casing. Tightening of the screws 22 holds the cover plate onto the casing and tightening of the screws 32 clamps the brackets against the wall of the counterbore.

Driving spindle adjustment can also be made by first making a temporary template to locate the pins 33 and the gears 43 for a certain layout, then removing the template and putting the cover plate into place on the casing and tightening the screws 22 and 32 and thereby lock the mechanism in the head into the position adjusted to by the template.

It is obvious that any number of brackets may be used to suit any layout of spindles; also that the length of the brackets, from curved or arcuate face thereof to the axis of the pin bearing holes may be varied; also that brackets can be used in which this length is different.

When spindles are to be adjustable only as to circular spacing thereof, but the radius of the arc of spacing remaining the same, the brackets are merely moved around on the wall of the counterbore to a desired setting and are then clamped into position. When a layout for spindles requires that two or more of the spindles have different radii from the axis of the main driving means, the gears 43 may be swung about on the axis of the pin 33 and followed up by moving the corresponding bracket circularly until the driving connection is attained between the spindle and the main driving means. By this means, spindles may be spaced on a circle having one radius or on arcs having different radii.

For ease of assembling the head by either method described, it is preferred that the ends 54 of the pins 33 be conical as shown so that the pins 33 and the corresponding bracket may easily find their proper locations while the cover is being attached to the casing if they were not accurately located or adjusted in the first locating or adjusting.

When it is desired to change a spindle layout, a new cover 19 is provided with new layout of holes therein for the sleeves 44 and fitting to the casing as does the cover plate shown. The old sleeves 44 with the mechanism thereon can then be inserted into the corresponding holes in the new cover and the cover plate is then attached to the old casing as and with the same screws as the old cover plate. In some instances it may be desirable to use a new gear 43 of larger or smaller diameter than that shown when a desired spindle layout can not be attained with the size of the gear shown.

The head shown and described is economical of structure and of operation, is easily adjusted to various spindle layouts, is efficient in retaining their adjustment in that the interlocking gear connections prevent the gears 43 from moving away from their set positions since they can not move out of position as long as the gears are in mesh and the gears can not move out of mesh as long as the cover plate is on the casing. The axes of the pins 33 and that of the stems 49 are in eccentric relationship but neither one of these axes can move laterally when the clamping is in effect and the cover plate is on the casing.

Applicants are aware that the present invention can be applied to heads other than the one shown and described and that changes and modifications can be made in the structure and arrangement of parts from that shown and described within the spirit and intent of the present invention and the appended claims. Therefore, without limiting ourselves to the precise application of our invention as shown and described nor to the precise structure and arrangement of elements as shown and described,

We claim:

1. A hollow, normally closed casing having a circular wall, a driving shaft journaled in an end wall of said casing and extending into the hollow of said casing and having a driving gear on the end inside of said casing, an endless guide way in the inner surface of said circular wall and being concentric with the axis of said shaft, a cover removably secured to said casing, a spindle mounted in said cover, a bracket movable in said guide way, a pin mounted in said bracket, a driving connection mounted on said pin and including a gear in permanent mesh with said driving gear, a gear to be brought into mesh with said gear on the spindle, a locking means to retain said bracket in an adjusted position in said guide way by the securing of said cover to said casing and said pin having an end engaging in said cover and the extreme end being tapered to first engage said cover and move said driving connection into driving relation with said spindle while said cover is being attached to said casing for securing the former to the latter.

2. A hollow normally closed casing consisting of a circular wall, a permanent wall at the upper end and a detachable cover plate for the lower end, said cover being secured in predetermined position to the casing, a driving shaft journaled in the upper end wall and extending into the casing and provided with a driving gear, an annular guideway in the interior of said circular wall concentric with said shaft, said cover being provided with a plurality of parallel spaced openings and a socket adjacent each opening, the distance between each opening and respective socket being the same, a sleeve detachably mounted in each of said openings, a spindle journaled in each of said sleeves, and having a driven gear at its inner end, brackets adjustable along said guideway, a shaft fixed in each bracket, gearing rotatable on each shaft, said gearing comprising a gear in mesh with the driving gear, and a gear integral therewith adapted to mesh with one of said driven gears, clamping means to retain said brackets in position on the guideway, said bracket shafts projecting therefrom and having tapered ends adapted to be inserted into said sockets thereby locating each of the brackets with the gearing thereon properly meshing with said driving gear and the respective driven gear of one of said spindles.

JOSEPH VERDERBER.
ELMER F. BATTERMAN.